United States Patent
Kaneko (10) Patent No.: US 10,366,709 B2
(45) Date of Patent: Jul. 30, 2019

(54) SOUND DISCRIMINATING DEVICE, SOUND DISCRIMINATING METHOD, AND COMPUTER PROGRAM

(71) Applicant: CANON KABUSHIKI KAISHA, Tokyo (JP)

(72) Inventor: Kazue Kaneko, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 15/478,645

(22) Filed: Apr. 4, 2017

(65) Prior Publication Data

US 2017/0294195 A1 Oct. 12, 2017

(30) Foreign Application Priority Data

Apr. 7, 2016 (JP) .................................. 2016-077252

(51) Int. Cl.
| | |
|---|---|
| G10L 15/02 | (2006.01) |
| G10L 15/22 | (2006.01) |
| G10L 15/26 | (2006.01) |
| G10L 25/78 | (2013.01) |
| G10L 25/24 | (2013.01) |
| G10L 25/21 | (2013.01) |
| G10L 25/18 | (2013.01) |

(52) U.S. Cl.
CPC .............. *G10L 25/78* (2013.01); *G10L 15/02* (2013.01); *G10L 25/18* (2013.01); *G10L 25/21* (2013.01); *G10L 25/24* (2013.01)

(58) Field of Classification Search
None
See application file for complete search history.

(56) References Cited

U.S. PATENT DOCUMENTS

| 5,189,701 A * | 2/1993 | Jain .......................... G10L 25/90 |
| | | 704/207 |
| 5,936,182 A * | 8/1999 | Izumisawa ............. G10H 1/053 |
| | | 84/623 |
| 2010/0286981 A1* | 11/2010 | Krini ........................ G10L 25/90 |
| | | 704/206 |
| 2011/0125493 A1* | 5/2011 | Hirose .................. G10L 21/003 |
| | | 704/207 |
| 2011/0153328 A1* | 6/2011 | Lim ........................ G10L 17/26 |
| | | 704/251 |

(Continued)

FOREIGN PATENT DOCUMENTS

JP 5619529 B2 9/2014

*Primary Examiner* — Shreyans A Patel
(74) *Attorney, Agent, or Firm* — Carter, DeLuca & Farrell LLP (57) ABSTRACT

A sound discriminating device capable of correctly discriminating a cry or other given sounds is provided. When a sound is input from a sound input unit, a feature amount extracting unit extracts a differential value between the amplitude of a fundamental frequency of the input sound and the amplitude of the second harmonic of the fundamental frequency as a feature amount of the input sound. A likelihood calculating unit calculates a likelihood between an acoustic model set for which a feature amount is known and the extracted feature amount. A result output unit determines whether or not the input sound is the given sound based on the result of the likelihood calculation.

13 Claims, 8 Drawing Sheets

(56) References Cited

U.S. PATENT DOCUMENTS

2013/0311192 A1* 11/2013 Moriya ............... G10L 19/0212
704/500
2015/0081283 A1* 3/2015 Sun ........................ G10L 25/18
704/205
2015/0154980 A1* 6/2015 Khan ...................... G10L 25/66
704/203

* cited by examiner

SOUND DISCRIMINATING DEVICE, SOUND DISCRIMINATING METHOD, AND COMPUTER PROGRAM

BACKGROUND OF THE INVENTION

Field of the Invention

The present invention relates to a sound discriminating device configured to determine, for example, whether or not there is an anomaly in a monitored place byway of sound quality.

Description of the Related Art

Devices of the related art that monitor whether or not there is an anomaly in a monitored place mainly use video. In recent years, however, attempts have been made to use audio as well as video. A device disclosed in Japanese Patent No. 5619529, for example, uses a scream to detect a robbery or other anomalies. This device detects as a scream a vowel sound with a given volume or more that lasts for a given length of time and that fluctuates in fundamental frequency and volume.

The device disclosed in Japanese Patent No. 5619529 may detect a sound that is not actually a scream as one when it is a loud vowel sound stretched for the given length of time. Examples of a voice that the device may erroneously detect as a scream include "Heeeey" (hailing someone across a distance, stretched in the middle), "gather rooooound" at shops (salespeople hawking their goods/services), and a voice amplified by a loudspeaker at a bank teller window. There is consequently a large chance for a false alarm in a routinely loud place. In addition, the distance from a microphone (hereinafter abbreviated as "mic") affects the volume of a sound. A sound that is actually a scream may therefore not be recognized as one when the distance from the mic is great.

It is a main object of the present invention to provide a sound discriminating device that is capable of correctly discriminating a given type of sound, for example, a cry of terror or anger.

SUMMARY OF THE INVENTION

A sound discriminating device according to the present disclosure includes a sound input unit configured to input a sound to the sound discriminating device; a feature amount extracting unit configured to extract, as a feature amount of the input sound, a differential value between an amplitude of an L-th harmonic of a fundamental frequency of the input sound and an amplitude of an (L+1)-th harmonic of the fundamental frequency where L is a natural number equal to or larger than 1; and a determining unit configured to determine whether or not the input sound is a given sound by using the extracted feature amount.

Further features of the present invention will become apparent from the following description of exemplary embodiments (with reference to the attached drawings).

DESCRIPTION OF THE EMBODIMENTS

Embodiments of the present invention are described below.

First Embodiment

Figure 1:
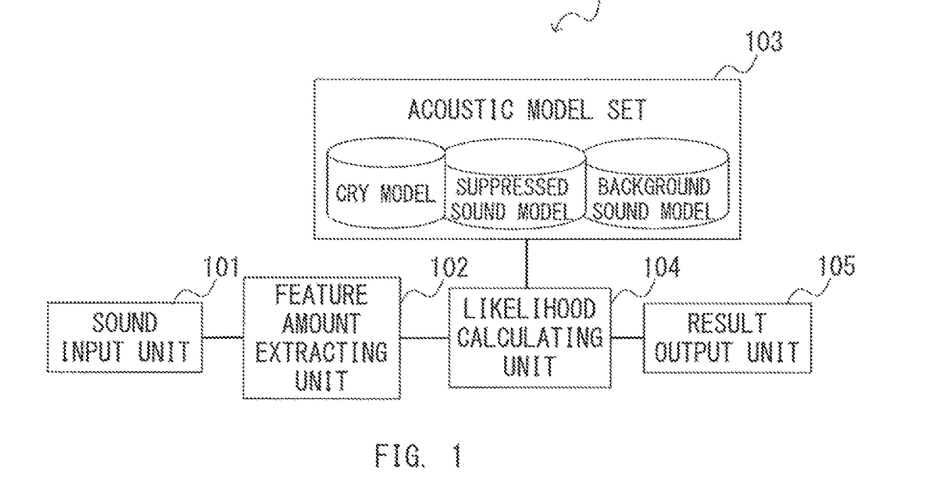
FIG. 1 is a function block diagram of a sound discriminating device according to an embodiment of the present invention.

A sound discriminating device is implemented by a computer, which includes a central processing unit (CPU), a read only memory (ROM), a random access memory (RAM), and an interface to external equipment, and by a given computer program. The CPU executes the computer program, thereby running the sound discriminating device on the computer. The ROM stores thereon the computer program and a control-use parameter. The RAM is used as a work area of the CPU. An example of the functional configuration of the sound discriminating device is illustrated in FIG. 1. Functions illustrated in FIG. 1 are provided by the computer executing the computer program that is stored in, for example, the storage device described above.

A sound input unit 101 is an interface to which a sound is input from a microphone, which is a type of external equipment. A feature amount extracting unit 102 is configured to extract a feature amount of the input sound by identifying the fundamental frequency and second harmonic of the input sound through frequency analysis of the input sound, and calculating a differential value between the amplitude of the identified fundamental frequency and the amplitude of the identified second harmonic. The uttered voice of a person is generally different in sound quality when the person is calm and when the person is under stress, and this embodiment focuses attention on this fact. Specifically, a fundamental frequency that serves as an indicator for a breathy sound or a hoarse sound is identified, and a differential value between an amplitude at the L-th (L is a natural number equal to or larger than 1) harmonic of the fundamental frequency and an amplitude at the (L+1)-th harmonic of the fundamental frequency is extracted. For example, when an amplitude at the fundamental frequency (i.e., L=1) of a sound is given as H1 and an amplitude at the second harmonic (i.e., L=2) is given as H2, a differential value between the former and the latter (H1-H2) is extracted as a feature amount of the sound. The extracted feature amount is used to discriminate a cry of terror or anger such as a scream or a verbal aggression. The differential value (H1-H2) is, for example, a large positive value in the case of a breathy sound, a large negative value in the case of a hoarse sound, and close to 0 in the case of a normal utterance. Sound discrimination that is not affected by sound volume and ambient sounds is therefore achieved by using the differential value as the feature amount of a sound.

The sound discriminating device 1 includes an acoustic model set 103. The acoustic model set 103 functions as a holding unit configured to hold a plurality of types of acoustic models for each of which a sound feature amount is known. Each acoustic model indicates the feature amount of a given sound that humans make, and is a model learned from a large number of sound feature amount samples. The acoustic model can be expressed as a Gaussian mixture model (GMM) of the differential value (H1-H2) or other parameters. A hidden Markov model (HMM) or the like may be used instead of a Gaussian mixture model (GMM). In this embodiment, the acoustic model set 103 holds a cry model, which indicates the feature of cries, a suppressed sound model, which indicates the feature of suppressed sounds, and a background sound model, which indicates the feature of background sounds. However, the present invention is not limited to the illustrated example, and can use various acoustic models suitable for the type of a sound to be discriminated.

A likelihood calculating unit 104 is configured to calculate the likelihood between a feature amount extracted by the feature amount extracting unit 102 and each of a plurality of types of acoustic models with reference to the acoustic model set 103. The likelihood is a numerical value (score) that indicates, when a result is yielded under a premise, the plausibility of the premise evaluated reversely from observation results. In short, the likelihood is calculated as a function that has "X" as a parameter when the premise is "X". The likelihood is also called a likelihood function, and is used in the maximum likelihood method, the likelihood ratio test, and the like. In this embodiment, the relative value of an input sound to each acoustic model, for example, the distance, which is shorter when the plausibility is stronger, is calculated as the likelihood.

A result output unit 105 functions as a determining unit configured to determine whether or not an input sound is a given sound using a feature amount extracted by the feature amount extracting unit 102. Specifically, the result output unit 105 calculates to which acoustic model the input sound is close (whether or not the input sound is a given sound) based on a likelihood obtained through calculation by the likelihood calculating unit 104. The result output unit 105 then outputs the result of determining whether or not the input sound includes a given sound that is defined in advance.

Figure 2:
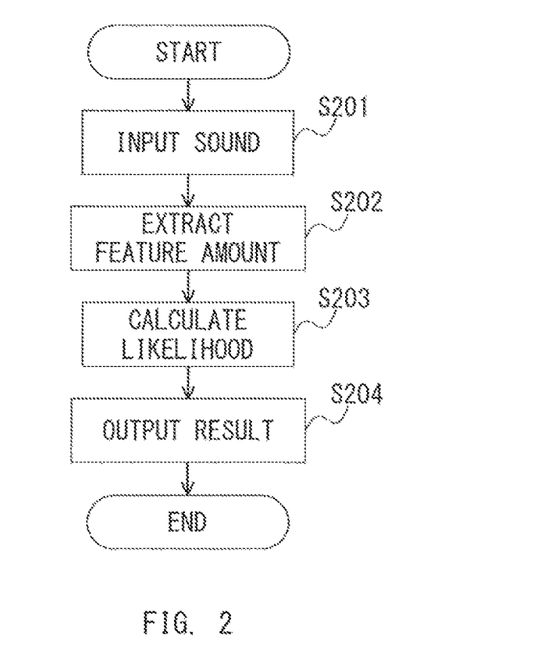
FIG. 2 is a processing procedure explanatory diagram of sound discriminating in a sound discriminating device according to a first embodiment of the present invention.

FIG. 2 is a processing procedure explanatory diagram of sound discriminating by the sound discriminating device 1. In the following description, the given sound is a human cry. The definition of a cry includes a scream and a verbal aggression (bawl, bellow, and so on).

The sound discriminating device 1 uses the sound input unit 101 to input a sound to the sound discriminating device 1 for a fixed length of time (Step S201), and extracts the feature amount of the input sound in the feature amount extracting unit 102 to compare the feature amount to acoustic models (Step S202). Once the feature amount of the input sound is extracted, the likelihood calculating unit 104 calculates the likelihood of each acoustic model stored in the acoustic model set 103 (Step S203). The result output unit 105 then compares the calculated likelihood values of the acoustic models, and outputs the result of the comparison (Step S204). In the case where the likelihood of the cry model is relatively high, the result output by the result output unit 105 determines that a cry is included in the input sound. In the case where the likelihood of the suppressed sound model or the background sound model is higher than the likelihood of the cry model, on the other hand, the result output by the result output unit 105 determines that the input sound does not include a cry.

The sound discriminating device 1 repeats the processing illustrated in FIG. 2 at regular intervals. The feature amount extracting unit 102 may execute pre-processing for determining whether or not the input sound is a human voice to extract the feature amount from a section in which the input sound is determined as a human voice. The likelihood calculating unit 104 in this case calculates the likelihood between the feature amount in the section and each acoustic model. This makes human voice recognition processing more accurate. Instead of using the GMM, the HMM, or other statistics models, a threshold may be set for the differential value described above or for other feature amounts to determine as a cry a sound that is equal to or higher than the given threshold, or equal to or lower than the threshold.

Figure 3:
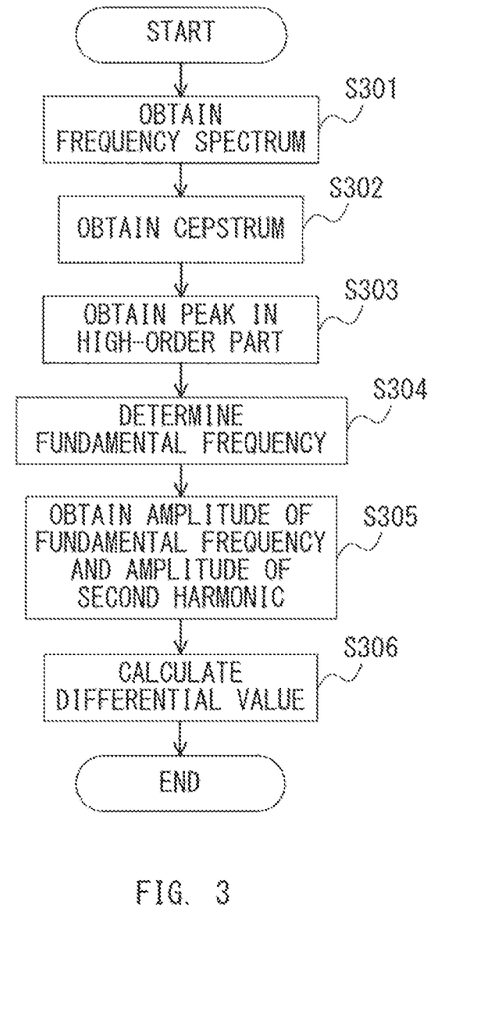
FIG. 3 is a processing procedure explanatory diagram of a feature amount extracting unit in the sound discriminating device according to the first embodiment of the present invention.
Figure 4A:
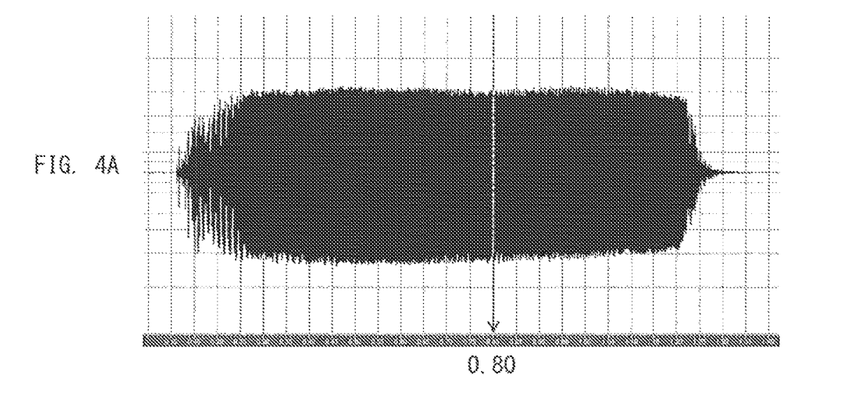
FIG. 4A, FIG. 4B, FIG. 4C, and FIG. 4D are explanatory graphs of feature amount extracting processing in the sound discriminating device according to the first embodiment of the present invention.

A detailed description is given next on the processing of the feature amount extracting unit 102 in the sound discriminating device according to the first embodiment. FIG. 3 is a processing procedure explanatory diagram of the feature amount extracting unit 102. FIG. 4A, FIG. 4B, FIG. 4C, and FIG. 4D are explanatory graphs of the specifics of the processing. An example of a case of extracting the differential value (H1-H2) as the feature amount is described here. The input sound is a female scream whose waveform example is shown in FIG. 4A, and is a sound sampled at 16,000 Hz. In FIG. 4A, the horizontal axis represents time (ms) and the vertical axis represents the amplitude of the waveform.

Figure 4B:
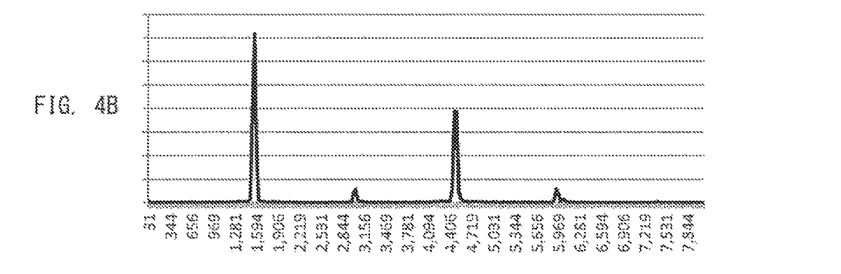
Figure 4C:
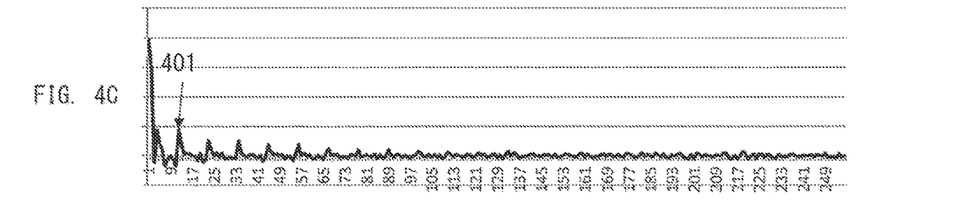

The feature amount extracting unit 102 performs discrete Fourier transform on the input sound, obtains the absolute value, and obtains the frequency spectrum of the sound (Step S301). The frequency spectrum of this scream at 800 ms is shown in FIG. 4B. In FIG. 4B, the horizontal axis represents the frequency and the vertical axis represents the amplitude. While values obtained by logarithmic transformation are usually used in a frequency spectrum, values shown in FIG. 4B are ones before logarithmic transformation. The feature amount extracting unit 102 then obtains a logarithm of the frequency spectrum and performs inverse Fourier transform to obtain a cepstrum (Step S302). A cepstrum is the result of performing Fourier transform (FT) on a sound spectrum that is regarded as a signal. FIG. 4C is a graph for showing a cepstrum of the scream at 800 ms. In FIG. 4C, the horizontal axis represents a quefrency corresponding to a reciprocal number of the frequency and the vertical axis represents the amplitude.

Thereafter, the feature amount extracting unit 102 ignores given low-order quefrencies and determines the peak among high-order quefrencies, namely, a quefrency that has the largest amplitude among high-order quefrencies (Step S303). The fundamental frequency can be obtained by calculating a reciprocal number of the determined quefrency. This is a common way of obtaining the fundamental frequency called a cepstrum method. For example, when low-order quefrencies up through the tenth order are ignored and the search is conducted on the eleventh order and higher, the peak is a twelfth-order quefrency 401. In this example, the input sound is a sound sampled at 16,000 Hz and the fundamental frequency is accordingly as 1,333 Hz by 16,000/12.

Figure 4D:
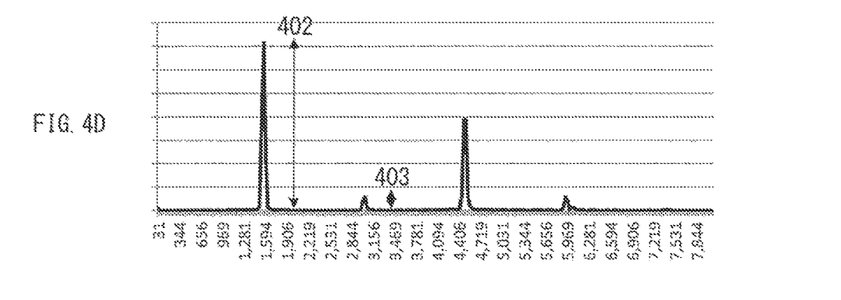

The feature amount extracting unit 102 next obtains the amplitude of the fundamental frequency on the frequency spectrum, and the amplitude of a frequency twice higher than the fundamental frequency (the second harmonic) (Step S304). In the cepstrum method, a frequency band corresponding to one quefrency is wider when the fundamental frequency is higher. The peak (maximum amplitude) in a frequency domain is therefore obtained by looking across a range that includes frequencies lower and higher than the fundamental frequency in this embodiment. FIG. 4D is a graph corresponding to the frequency spectrum of FIG. 4B. In FIG. 4D, the amplitude H1 in a range around the fundamental frequency 1,333 Hz is indicated by 402, and the amplitude H2 in a range around the harmonic 2,666 Hz is indicated by 403.

The feature amount extracting unit 102 calculates a differential value between the amplitude H1 and the amplitude H2 as the feature amount of the input sound (Step S306). The differential value (H1-H2) tends to be a large positive value in the case of a female scream, a large negative value in the case of a male scream, a male voice verbally abusing someone, and a female voice verbally abusing someone, and close to 0 in the case of a normal utterance. When an acoustic model is created using this differential value, an acoustic model for cries, which are used as the given sound, may include a female scream, a female voice verbally abusing someone, a male scream, and a male voice verbally abusing someone. The amplitude used in this embodiment is one before logarithmic transformation, but may instead be one after logarithmic transformation. The value of the amplitude may be expressed in a ratio to an average amplitude of all frequencies in order to reduce the influence of sound volume.

The result output unit 105 may determine whether or not the input sound is a given sound from the magnitude in an absolute value of the differential value (H1-H2). For example, the result output unit 105 may determine that the input sound is a cry when the absolute value is large, while determining the input sound as a normal utterance when the absolute value is small. In the example of FIG. 4D, which is of a female scream, the differential value (H1-H2) is a large positive value.

Figure 9A:
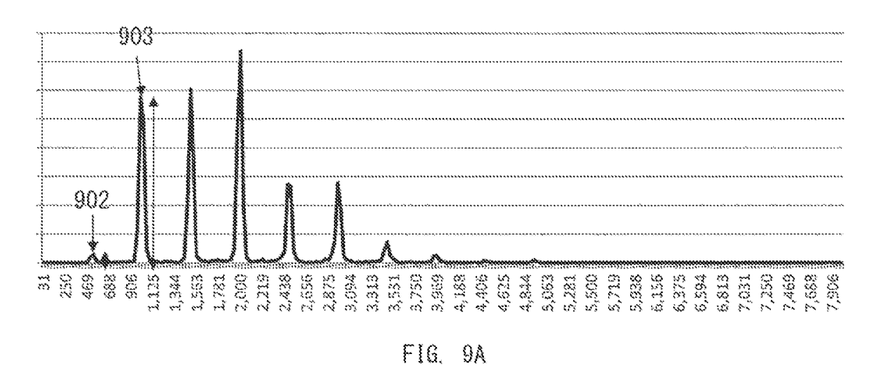
FIG. 9A and FIG. 9B are exemplary graphs of the result of analyzing the frequency of a male voice verbally abusing someone.
Figure 9B:
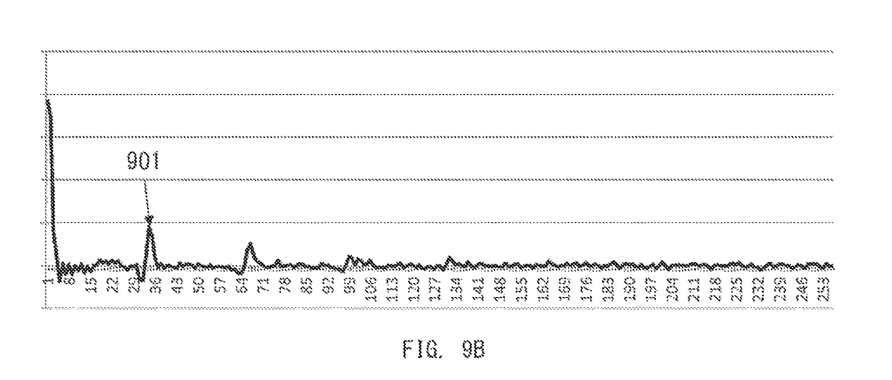

An example of a male utterance is described for comparison. FIG. 9A is a graph for showing the frequency spectrum of a male voice verbally abusing someone, and FIG. 9B is a graph for showing a cepstrum of the verbal aggression for a fixed length of time. A high-order peak 901 shown in FIG. 9B has a fundamental frequency around 500 Hz. The amplitude H1 of the fundamental frequency and the amplitude H2 of the second harmonic are denoted by 902 and 903 in FIG. 9A, respectively. The differential value (H1-H2) in this case is a negative value having a large absolute value. Although the differential value in the case of a verbal aggression is a negative value, a scream and a verbal aggression are both cries and the differential value in the case of a scream and the differential value in the case of a verbal aggression both are thus larger in absolute value than a normal utterance. The sound discriminating device 1 is therefore capable of discriminating a male utterance as a cry.

Second Embodiment

In the cepstrum method, low-order portions of the cepstrum correspond to vocal tract characteristics (a spectral envelop) and are therefore not usually used to obtain the fundamental frequency. However, the fundamental frequency of a female scream or the like is around 1,000 Hz in some cases and over 2,000 Hz in other cases.

While the given low-order quefrencies to be ignored are quefrencies up through the tenth order in the example described in the first embodiment, a second embodiment deals with an example of a case where fewer low-order quefrencies than in the first embodiment are ignored by using a method specialized for a purpose, an ad hoc method, so to speak.

Figure 5:
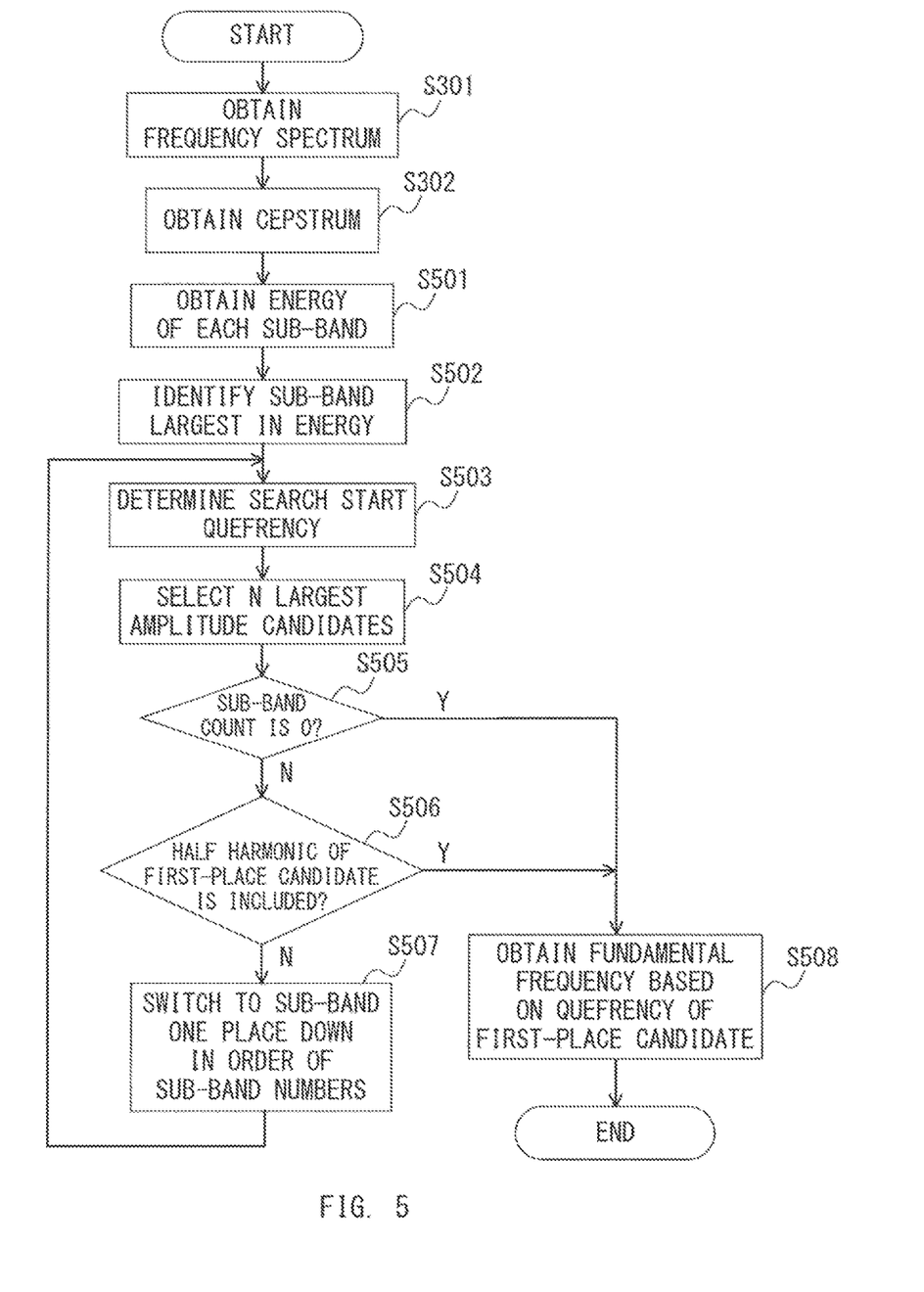
FIG. 5 is a processing procedure explanatory diagram of a feature amount extracting unit in a sound discriminating device according to a second embodiment of the present invention.
Figure 6A:
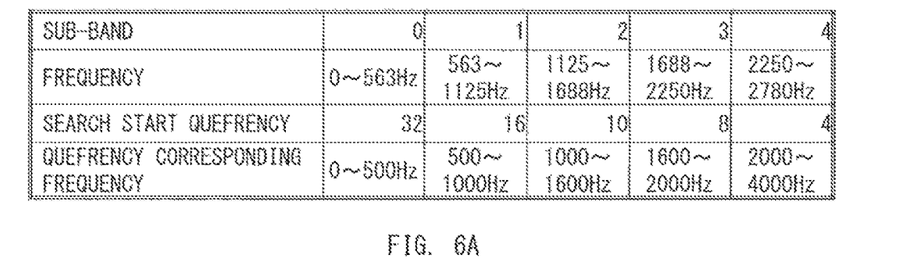
FIG. 6A, FIG. 6B, and FIG. 6C are an explanatory table and explanatory graphs of feature amount extracting processing in the sound discriminating device according to the second embodiment of the present invention.
Figure 6B:
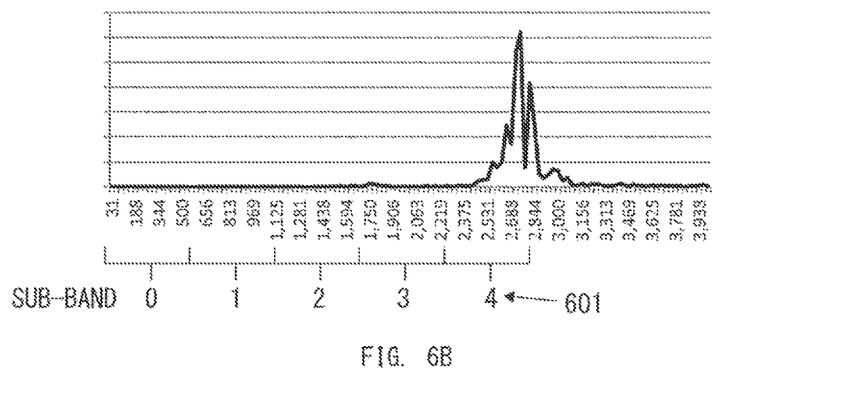
Figure 6C:
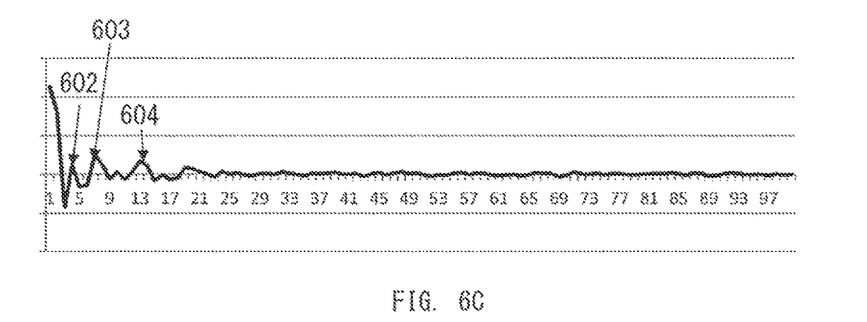

FIG. 5 is a processing procedure explanatory diagram of the feature amount extracting unit 102 in a sound discriminating device according to the second embodiment. FIG. 6A, FIG. 6B, and FIG. 6C are an explanatory table and explanatory graphs of the specifics of the processing. In FIG. 5, Steps S301 and S302 are the same as those of the processing illustrated in FIG. 3. The feature amount extracting unit 102 in the second embodiment obtains the cepstrum in Step S302 and then sorts the frequencies of the input sound into a plurality of sub-bands to measure the sub-band energy of each sub-band (Step S501). The sub-bands are created by dividing the frequency band of human voice, and the sub-band energy of each sub-band is the sum of amplitudes in the sub-band. The association relation between a frequency and a sub-band is shown in FIG. 6A. In this example, a human voice frequency band 0 Hz to 2,780 Hz is divided into five sub-bands, 0 to 4. Specifically, 0 Hz to 563 Hz is classified as the sub-band 0, and 563 Hz to 1,125 Hz is classified as the sub-band 1. Similarly, 1,125 Hz to 1,688 Hz is classified as the sub-band 2, 1,688 Hz to 2,500 Hz is classified as the sub-band 3, and 2,500 Hz to 2,780 Hz is classified as the sub-band 4. The relation between the sub-bands 0 to 4 and the frequency spectrum of the input sound is shown in FIG. 6B.

From each of the sub-bands organized in descending order of sub-band energy, the feature amount extracting unit 102 selects top N candidates in descending order of amplitude in the cepstrum of the sub-band. The feature amount extracting unit 102 then repeats a search for finding out whether or not the top N candidates include the first-place candidate and a candidate that corresponds to the half harmonic of the first-place candidate, until the first-place candidate and the candidate that corresponds to the half harmonic of the first-place candidate are found. To give a specific example, a sub-band that has the largest sub-band energy of the five sub-bands 0 to 4 is identified (Step S502). A sub-band energy 601 is centered in the fifth sub-band 4 in FIG. 6B. The feature amount extracting unit 102 accordingly identifies the sub-band 4 as a sub-band on which attention is to be focused first, and determines a search start quefrency (start point) associated with the sub-band 4 (Step S503). The feature amount extracting unit 102 also determines a search range from the start point to a quefrency at which the search is ended (end point). The cepstrum in the sub-band 4 is as shown in FIG. 6C. The search range has a variable start point and an endpoint that is fixed to the last quefrency position. The search start quefrency of the sub-band 4 is "4" in FIG. 6A. The end point quefrency is "256" in any sub-band. The feature amount extracting unit 102 examines amplitudes in this search range and selects top N (N is a natural number) candidates (Step S504). Candidates are selected in descending order of amplitude. The number N is an arbitrary number, for example, 3. In this case, a candidate of a quefrency "7" is a first-place candidate 603, a candidate of a quefrency "13" is a second-place candidate 604, and a candidate of the quefrency "4" is a third-place candidate 602 in the example of FIG. 6C.

Returning to FIG. 5, the feature amount extracting unit 102 determines whether or not the number of sub-bands is 0, in other words, whether or not there is a sub-band that can be shifted positionally (Step S505). When the sub-band count is not 0 (Step S505: N), that is, in the case of this example, the feature amount extracting unit 102 checks whether or not the top three candidates include a candidate that corresponds to the half harmonic of the first-place candidate 603 (a quefrency at the position of the half harmonic) (Step S506). The candidate corresponding to the half harmonic of the first-place candidate 603 is the second-place candidate 604 in this example. The feature amount extracting unit 102 therefore uses the first-place candidate 603 to obtain the fundamental frequency (Step S508). Similar processing is executed also when the sub-band count is 0 in Step S505 (Step S505: Y).

In the case where the identified sub-band does not have a qualifying candidate at the position of the half harmonic of the first-place candidate (Step S506: N), on the other hand, the feature amount extracting unit 102 newly selects top N candidates after switching to another sub-band to focus on. The feature amount extracting unit 102 repeats a search for finding out whether or not the selected candidates include a first-place candidate and a candidate corresponding to the half harmonic of the first-place candidate, until the first-place candidate and the candidate corresponding to the half harmonic of the first-place candidate are found. For instance, the feature amount extracting unit 102 switches to a sub-band one place down in the order of sub-band numbers (Step S507). In this example, the sub-band to focus on is shifted from the sub-band 4 to the sub-band 3. The feature amount extracting unit 102 then repeats Step S503 and the subsequent processing steps. Specifically, the feature amount extracting unit 102 determines a start point quefrency that is associated with the sub-band one place down in the order of sub-band numbers (in the case of the sub-band 3, a quefrency "8" from FIG. 6A), and selects top three candidates again. The previous second-place candidate 602 and first-place candidate 603 are excluded from the new candidates in this case.

In Step S502, instead of selecting a sub-band that has the largest sub-band energy, the sub-band energy of each sub-band may be obtained in ascending order of sub-band position to select the first sub-band whose sub-band energy is larger than an average by a fixed amount or more. This is because a human voice is formed of harmonics that have wide bands in some cases. In the case of a voice that has a high fundamental frequency, the sub-band energy is small in a low frequency range, whereas the sub-band energy is distributed among low frequencies as well in the case of a voice that has a low fundamental frequency. The fundamental frequency is therefore not always at a point where the sub-band energy is largest.

Third Embodiment

A microphone that is used outdoors or similar equipment may use a high pass filter, which cuts off sounds in a low frequency band (for example, 0 Hz to 300 Hz) in order to remove wind noise and other noises. In the cepstrum method where harmonics information of a sound is convolutional, the fundamental frequency of a normal human utterance is sometimes detected in 0 Hz to 300 Hz as a result of observing a large amplitude at a corresponding quefrency. However, in the case where the differential value (H1-H2) is calculated from the amplitude H1 at a frequency that is removed by the high pass filter and the amplitude H2 at a frequency that is not removed by the high pass filter after the detection of the fundamental frequency, the differential value is large even when the input sound is a normal utterance. Consequently, a normal utterance may not be distinguishable from a cry or other given sounds.

A third embodiment addresses this by obtaining, when the input sound is a sound that has been filtered by a high pass filter and has a fundamental frequency within a cut-off frequency range of the high pass filter, an amplitude at the position of the M-th harmonic of the fundamental frequency that is outside the cut-off frequency range, as a substitute for the amplitude of the fundamental frequency. The third embodiment also involves obtaining an amplitude at the position of the (M+1)-th harmonic, as a substitute for the amplitude of the second harmonic. A differential value is derived from the two substitute amplitudes. M is a natural number equal to or larger than 1.

Figure 7:
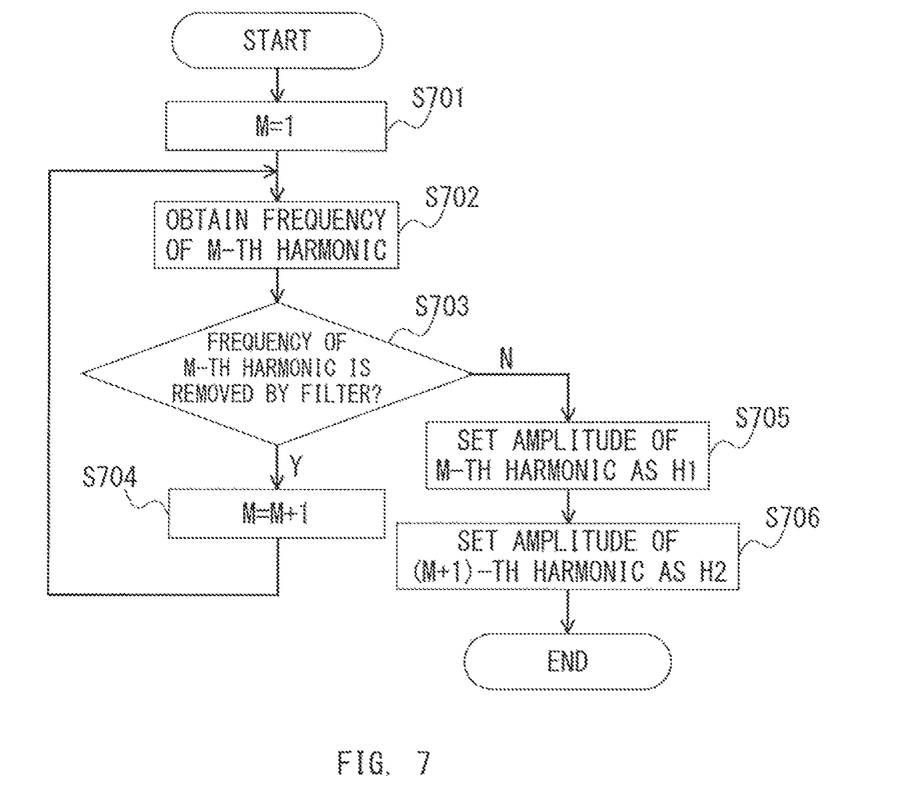
FIG. 7 is a processing procedure explanatory diagram of a feature amount extracting unit in a sound discriminating device according to a third embodiment of the present invention.

FIG. 7 is a processing procedure explanatory diagram of a feature amount extracting unit 102 in a sound discriminating device according to the third embodiment. Before this processing procedure is described, a description on the premise of the third embodiment is given with reference to FIG. 8A, FIG. 8B, FIG. 8C, and FIG. 8D.

Figure 8A:
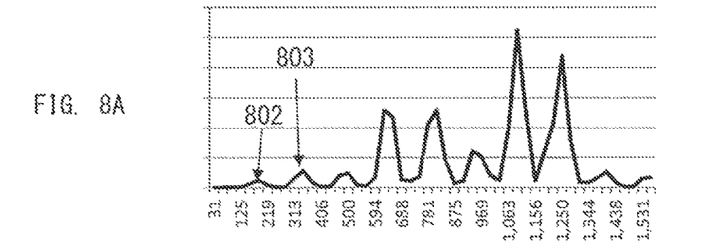
FIG. 8A, FIG. 8B, FIG. 8C, and FIG. 8D are explanatory graphs of feature amount extracting processing in the sound discriminating device according to the third embodiment of the present invention.
Figure 8B:
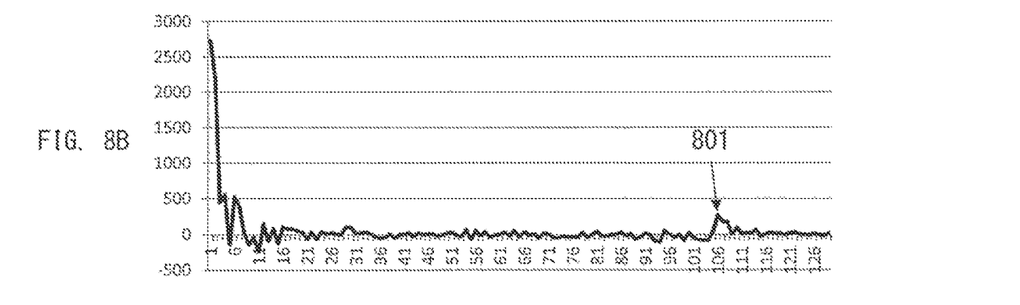
Figure 8C:
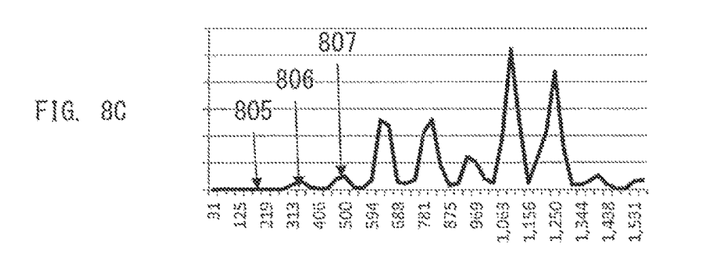
Figure 8D:
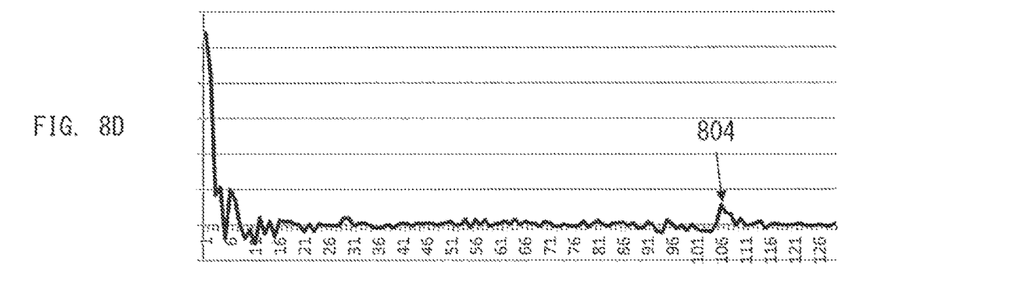

FIG. 8A is a graph for showing the frequency spectrum of a section of a normal utterance in the case where a high pass filter is not applied, and has the amplitude H1 at a fundamental frequency point 802 and the amplitude H2 at a second-harmonic point 803, where the second harmonic of the fundamental frequency is located. FIG. 8B is a graph for showing a cepstrum corresponding to FIG. 8A, and has an amplitude peak at a point 801. FIG. 8C is a graph for showing the frequency spectrum of a section of a normal utterance in the case where a high pass filter that cuts off frequencies up to 300 Hz is applied. A point 805 is the position of an amplitude corresponding to the fundamental frequency, a point 806 is the position of an amplitude corresponding to the second harmonic, and a point 807 is the position of an amplitude corresponding to the third harmonic. When a normal utterance is filtered through the high pass filter, an amplitude at the point 805, which corresponds to the fundamental frequency, cannot be observed. However, it is observed that a point 804 where the amplitude peaks in FIG. 8D, which is a graph for showing a cepstrum corresponding to FIG. 8C, is in substantially the same position as the point 801 in FIG. 8B. In short, removing the signal of the fundamental frequency using a high pass filter does not change where the amplitude peaks in a cepstrum. The third embodiment focuses attention on this fact, and substitutes the differential value between the amplitude H1 and the amplitude H2 with a differential value between the amplitudes of other combinations of frequencies than the combination of the fundamental frequency and the second harmonic.

Referring to FIG. 7, the feature amount extracting unit 102 first sets a parameter N, which indicates the order of a harmonic, to 1 (Step S701). The parameter N that is 1 means the fundamental frequency. The feature amount extracting unit 102 then obtains the fundamental frequency (Step S702). Whether or not the obtained fundamental frequency is within the cut-off frequency range of the high pass filter is determined (Step S703). When the fundamental frequency is outside the cut-off frequency range, the input sound is not affected by the high pass filter in the first place. The feature amount extracting unit 102 therefore sets, in the case where the fundamental frequency is outside the cut-off frequency range (Step S703: N), an amplitude at the fundamental frequency as H1 (Step S705) and an amplitude at the second harmonic as H2 (Step S706).

When it is determined in Step S703 that the fundamental frequency is within the cut-off frequency range (Step S703: Y), the feature amount extracting unit 102 proceeds to Step S704 to increase N by 1 and repeats the processing. Specifically, the feature amount extracting unit 102 obtains the frequency of the second harmonic (Step S702) and determines whether or not the frequency of the second harmonic is cut off (Step S703). The second harmonic frequency at the amplitude point 806 of FIG. 8C is higher than 300 Hz (Step S703: Y). The feature amount extracting unit 102 accordingly substitutes the maximum amplitude of the spectrum around the amplitude point corresponding to the second harmonic for the amplitude H1 of the fundamental frequency (Step S705). The feature amount extracting unit 102 also substitutes the maximum amplitude of the spectrum at the amplitude point 807 corresponding to the third harmonic for the amplitude H2 of the second harmonic (Step S706).

Effects of the Embodiments

As described above, the first embodiment to the third embodiment use a differential value (including the absolute value thereof) between the amplitude of the fundamental frequency and the amplitude of the second harmonic as a feature amount for determining whether or not an input sound is a given sound. Specifically, a differential value between the amplitude of a fundamental frequency that serves as an indicator for a breathy sound or a hoarse sound and an amplitude at the second harmonic is extracted as the feature amount of a cry of terror or anger, for example, a scream or a verbal aggression. This solves the problem in that a cry of terror or anger cannot be distinguished from a loud voice or a voice amplified by a loudspeaker by volume alone, and the problem in that a given sound (a scream, a cry, or the like) at a distance from the mic cannot be detected.

Modification Example

The example described in the first embodiment to the third embodiment is of the case where the feature amount extracted by the feature amount extracting unit 102 is a differential value between the amplitude of the fundamental frequency and the amplitude of the second harmonic. However, the present invention is not limited to this example. Other parameters, for example, a mel-frequency cepstrum coefficient (MFCC), may be extracted as the feature amount of a sound. The MFCC is a feature amount that indicates vocal tract characteristics as the cepstrum is. The difference between the cepstrum and the MFCC is that the MFCC takes features (mel) of phonetic perception of human into consideration. The MFCC can be extracted by a known method. Specifically, high-range components of a sound waveform are emphasized by a pre-emphasis filter, the waveform is multiplied by a window function, and then an amplitude spectrum is obtained. The amplitude spectrum is subsequently compressed by filtering using a mel-filter bank. The compressed numerical sequence is regarded as a signal and undergoes discrete cosine transform. A low-order component of the resultant cepstrum serves as an MFCC.

Other feature amounts than the MFCC that are often used in sound discriminating technology and the like may be employed, for example, the spectral centroid, sub-band energy, and the zero-crossing count. The fundamental frequency may also be obtained by other methods than the cepstrum method, for example, autocorrelation.

Application Example

The sound discriminating device of each embodiment described above can be incorporated in a monitoring device configured to monitor whether or not there is an anomaly in a monitored place, for example, a bank teller window or a shop, as a way to perform monitoring that replaces video monitoring or that is used in combination with video monitoring. The sound discriminating device can also be utilized as a sensor for a remote monitoring device that is connected by the Internet or other networks.

As described above, according to the present invention, where a differential value that indicates sound quality is extracted as the feature amount of a sound, whether an input sound is a given vocal sound or other sounds/vocal sounds can thus be determined correctly.

Various types of control described in the embodiments are implemented by, for example, a micro-processing unit (MPU), an application-specific integrated circuit (ASIC), or a System-on-a-Chip (SoC). The present invention can be carried out also by supplying software (a computer program) that implements the functions of the described embodiments to a system or a device via a network or various storage media, and reading and executing the program on a computer (or CPU, MPU, or the like) of the system or of the device. In this case, the program and a storage medium that stores the program thereon are included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-077252, filed Apr. 7, 2016 which is hereby incorporated by reference herein in its entirety.

What is claimed is:

1. A sound discriminating device comprising:
a sound input unit configured to input a sound to the sound discriminating device;
a feature amount extracting unit configured to extract, as a feature amount of the input sound, a differential value between an amplitude of a fundamental frequency of the input sound and an amplitude of a second harmonic of the fundamental frequency; and
a determining unit configured to determine whether or not the input sound is a given sound by using the extracted feature amount,
wherein the given sound includes a scream or a verbal aggression such as a female scream, a female voice verbally abusing someone, a male scream, and a male voice verbally abusing someone,
wherein the differential value tends to be a large positive value in a case of the input sound being a female scream, and a large negative value in a case of the input sound being a male scream, a male voice verbally abusing someone, and a female voice verbally abusing someone.

2. The sound discriminating device according to claim 1, wherein the feature amount is an absolute value of the differential value, and
wherein the determining unit is configured to determine whether or not the input sound is the given sound from a magnitude of the absolute value.

3. The sound discriminating device according to claim 1, wherein the feature amount extracting unit is configured to extract the feature amount from a section that is determined as a human voice after executing pre-processing for determining whether or not the input sound is a human voice.

4. A sound discriminating device comprising:
a sound input unit configured to input a sound to the sound discriminating device;
a feature amount extracting unit configured to extract, as a feature amount of the input sound, a differential value between an amplitude of an L-th harmonic of a fundamental frequency of the input sound and an amplitude of an (L+1)-th harmonic of the fundamental frequency where L is a natural number equal to or larger than 1; and
a determining unit configured to determine whether or not the input sound is a given sound by using the extracted feature amount,
wherein the feature amount extracting unit is configured to sort frequencies of the input sound into a plurality of sub-bands, measure sub-band energy of each of the plurality of sub-bands, identify a sub-band that has the largest sub-band energy, select top N candidates in descending order of amplitude in a cepstrum of the identified sub-band, and obtain, in a case where the top N candidates include a first-place candidate and a candidate corresponding to a half harmonic of the first-place candidate, the fundamental frequency based on the first-place candidate.

5. The sound discriminating device according to claim 4, wherein the feature amount extracting unit is configured to select, in a case where the top N candidates selected from the identified sub-band do not include the first-place candidate and the candidate corresponding to the half harmonic of the first-place candidate, new top N candidates from another sub-band, and repeat a search for finding out whether or not the selected candidates include a first-place candidate and a candidate corresponding to a half harmonic of the first-place candidate, until the first-place candidate and the candidate corresponding to the half harmonic of the first-place candidate are found.

6. The sound discriminating device according to claim 1, further comprising a holding unit configured to hold a plurality of types of acoustic models for each of which a sound feature amount is known,
wherein the determining unit is configured to determine whether or not the input sound is the given sound based on a likelihood between the feature amount extracted by the feature amount extracting unit and each of the plurality of types of acoustic models.

7. The sound discriminating device according to claim 6, wherein the plurality of types of acoustic models include, as the given sound, acoustic models of a female scream, a female voice verbally abusing someone, a male scream, and a male voice verbally abusing someone.

8. The sound discriminating device according to claim 1, wherein the sound input unit is configured to input to the sound discriminating device a sound that has been filtered by a high pass filter, and
wherein the feature amount extracting unit is configured to obtain, in a case where the fundamental frequency of the input sound is within a cut-off frequency range of the high pass filter, an amplitude at a position of an M-th harmonic of the fundamental frequency that is outside the cut-off frequency range, as a substitute for the amplitude of the fundamental frequency, obtain an amplitude at a position of an (M+1)-th harmonic, as a substitute for the amplitude of the second harmonic where M is a natural number equal to or larger than 1, and derive the differential value from the substitute amplitudes.

9. A sound discriminating method, which is executed by a device that is configured to determine whether or not sound input to the device is a given sound through comparison between a feature amount of the input sound and each of a plurality of types of acoustic models for which a sound feature amount is known, the device comprising a sound input unit configured to input the sound to the device, the sound discriminating method comprising:
identifying, by the device, through frequency analysis of the input sound, a harmonic of a fundamental frequency of the input sound and a second harmonic of the fundamental frequency; and
using a differential value between an amplitude of the identified harmonic and an amplitude of the identified second harmonic in the comparison to the acoustic model as the feature amount of the input sound,
wherein the plurality of types of acoustic models include, as the given sound, acoustic models of a female scream, a female voice verbally abusing someone, a male scream, and a male voice verbally abusing someone, and
wherein the differential value tends to be a large positive value in a case of the input sound being a female scream, and a large negative value in a case of the input sound being a male scream, a male voice verbally abusing someone, and a female voice verbally abusing someone.

10. A sound discriminating method, which is executed by a device that is configured to determine whether or not a sound input to the device is a given sound through comparison between a feature amount of the input sound and each of a plurality of types of acoustic models for which a sound feature amount is known, the device comprising a sound input unit configured to input the sound to the device, the sound discriminating method comprising:

identifying, by the device, through frequency analysis of the input sound, an L-th harmonic of a fundamental frequency of the input sound and an (L+1)-th harmonic of the fundamental frequency, where L is a natural number equal to or greater than 1;
  using a differential value between an amplitude of the identified L-th harmonic and an amplitude of the identified (L+1)-th harmonic in the comparison to an acoustic model as the feature amount of the input sound;
  sorting, by the device, frequencies of the input sound into a plurality of sub-bands;
  measuring, by the device, sub-band energy of each of the plurality of sub-bands;
  selecting, by the device, from each of the plurality of sub-bands organized in descending order of sub-band energy, top N candidates in descending order of amplitude in a cepstrum of the sub-band; and
  repeating, by the device, a search for finding out whether or not the top N candidates include a first-place candidate and a candidate corresponding to a half harmonic of the first-place candidate, until the first-place candidate and the candidate corresponding to the half harmonic of the first-place candidate are found,
  wherein the plurality of types of acoustic models include, as the given sound, acoustic models of a female scream, a female voice verbally abusing someone, a male scream, and a male voice verbally abusing someone,
  wherein the differential value tends to be a large positive value in a case of the input sound being a female scream, and a large negative value in a case of the input sound being a male scream, a male voice verbally abusing someone, and a female voice verbally abusing someone.

11. The sound discriminating method according to claim 9, further comprising:

obtaining, by the device, in a case where the input sound is a sound that has been filtered by a high pass filter and the fundamental frequency is within a cut-off frequency range of the high pass filter, an amplitude at a position of an M-th harmonic of the fundamental frequency that is outside the cut-off frequency range, as a substitute for the amplitude of the fundamental frequency, and an amplitude at a position of an (M+1) harmonic, as a substitute for the amplitude of the second harmonic where M is a natural number equal to or larger than 1; and
  deriving, by the device, the differential value from the substitute amplitudes.

12. The sound discriminating method according to claim 9, wherein, instead of the differential value, a mel-frequency cepstrum coefficient is extracted as the feature amount.

13. A non-transitory computer readable storage medium storing instruction for realizing the method as described in claim 9 with a computer.

* * * * *